United States Patent
Jang

(10) Patent No.: US 8,599,117 B2
(45) Date of Patent: Dec. 3, 2013

(54) EMISSION CONTROL DRIVER AND ORGANIC LIGHT EMITTING DISPLAY DEVICE USING THE SAME

(75) Inventor: Hwan-Soo Jang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 580 days.

(21) Appl. No.: 12/608,991

(22) Filed: Oct. 29, 2009

(65) Prior Publication Data
US 2010/0188316 A1 Jul. 29, 2010

(30) Foreign Application Priority Data
Jan. 29, 2009 (KR) .......................... 10-2009-0006909

(51) Int. Cl.
*G09G 3/30* (2006.01)
(52) U.S. Cl.
USPC .............................................. 345/77; 345/82
(58) Field of Classification Search
USPC ................ 345/36, 39, 42, 45–48, 100, 76–86
See application file for complete search history.

(56) References Cited

U.S. PATENT DOCUMENTS

| | | | |
|---|---|---|---|
| 2006/0087478 A1* | 4/2006 | Eom ................................. | 345/45 |
| 2006/0145964 A1* | 7/2006 | Park et al. ........................ | 345/76 |
| 2007/0040771 A1* | 2/2007 | Chung et al. .................... | 345/76 |
| 2007/0240024 A1* | 10/2007 | Shin .............................. | 714/726 |
| 2008/0030439 A1* | 2/2008 | Shin .............................. | 345/82 |

FOREIGN PATENT DOCUMENTS

| | | |
|---|---|---|
| KR | 10-2006-0112994 A | 11/2006 |
| KR | 10-2006-0114471 A | 11/2006 |
| KR | 100646992 B1 | 11/2006 |
| KR | 10-0666637 B1 | 1/2007 |
| KR | 10-2007-0048524 A | 5/2007 |
| KR | 10-0759672 B1 | 9/2007 |
| KR | 10-2007-0103183 A | 10/2007 |

OTHER PUBLICATIONS

KIPO Office action dated Sep. 30, 2010 in priority Korean application No. 10-2009-0006909.

* cited by examiner

*Primary Examiner* — Chanh Nguyen
*Assistant Examiner* — Sanghyuk Park
(74) *Attorney, Agent, or Firm* — Christie, Parker & Hale, LLP

(57) ABSTRACT

An emission control driver includes a plurality of stages, each of the plurality of stages including a first driver for outputting a first output signal corresponding to one of the first output signal output from a previous stage or a first start pulse; a second driver for outputting a second output signal corresponding to one of the second output signal output from the previous stage or a second start pulse; and a third driver for receiving the first and second output signals and for outputting an emission control signal.

23 Claims, 8 Drawing Sheets

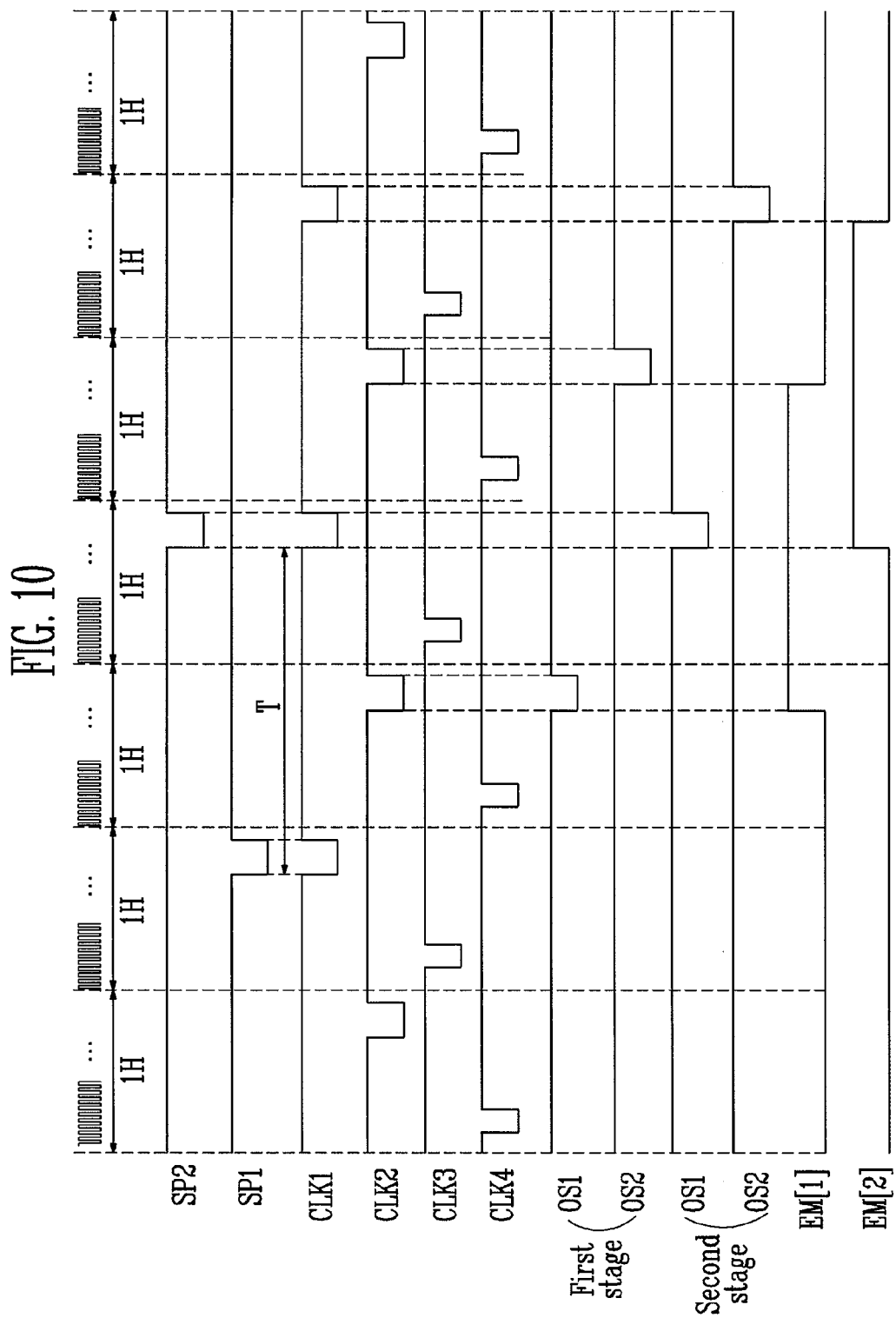

EMISSION CONTROL DRIVER AND ORGANIC LIGHT EMITTING DISPLAY DEVICE USING THE SAME

CROSS-REFERENCE TO RELATED APPLICATIONS

This application claims priority to and the benefit of Korean Patent Application No. 10-2009-0006909, filed on Jan. 29, 2009, in the Korean Intellectual Property Office, the entire content of which is incorporated herein by reference.

BACKGROUND OF THE INVENTION

1. Field of the Invention

The present invention relates to an emission control driver and an organic light emitting display device using the same.

2. Description of Related Art

Recently, various types of flat panel display devices have been developed having reduced weight and volume compared to cathode ray tubes. Such flat panel display devices include liquid crystal display devices, field emission display devices, plasma display panels, and organic light emitting display devices, among others.

Among these flat panel display devices, the organic light emitting display device displays images using organic light emitting diodes that emit light through the recombination of electrons and holes. The organic light emitting display device has a fast response time and is driven with low power consumption. In a conventional organic light emitting display device, current corresponding to a data signal is supplied to an organic light emitting diode using a transistor in each pixel, so that light is generated from the organic light emitting diode.

The conventional organic light emitting display device includes a data driver for supplying data signals to data lines; a scan driver for sequentially supplying scan signals to scan lines; an emission control driver for supplying emission control signals to emission control lines; and a display unit including a plurality of pixels coupled to the data lines, the scan lines and the emission control lines.

When a scan signal is supplied to a scan line, pixels included in the display unit are selected and receive data signals supplied from the data lines, respectively. The pixels receiving the respective data signals generate light with luminances corresponding to the data signals, thereby displaying an image (e.g., a predetermined image). Here, the emission time of each of the pixels is controlled by an emission control signal supplied from an emission control line. Generally, an emission control signal overlaps with the scan signal supplied to one or two scan lines, and sets pixels to which data signals are supplied to be in a non-emission state.

Recently, studies have been actively conducted to obtain optimum luminances of a panel corresponding to an amount of external light. The luminance of the panel may be controlled using a variety of methods. For example, the luminance of the panel may be controlled by adjusting a number of bits of data corresponding to an amount of external light. However, a complicated process is necessarily performed to adjust the number of bits of data.

SUMMARY OF THE INVENTION

Accordingly, exemplary embodiments of the present invention provide an emission control driver for controlling a width of an emission control signal, and an organic light emitting display device using the same.

According to an aspect of an exemplary embodiment of the present invention, there is provided an emission control driver including a plurality of stages, each of the plurality of stages including a first driver for outputting a first output signal corresponding to one of the first output signal output from a previous stage of the plurality of stages or a first start pulse; a second driver for outputting a second output signal corresponding to one of the second output signal output from the previous stage or a second start pulse; and a third driver for receiving the first and second output signals and for outputting an emission control signal, wherein odd-numbered stages of the plurality of stages coupled to corresponding odd-numbered emission control lines are configured to be driven by a first clock signal, a second clock signal, and a third clock signal from among a plurality of clock signals, and wherein even-numbered stages of the plurality of stages coupled to corresponding even-numbered emission control lines are configured to be driven by the first clock signal, the second clock signal, and a fourth clock signal from among the plurality of clock signals.

The plurality of clock signals may be sequentially supplied in an order of the second clock signal, the third clock signal, the first clock signal, and the fourth clock signal. The first clock signal, the second clock signal, the third clock signal, and the fourth clock signal may have a substantially same period as one another.

Each of the first and second drivers may include a second transistor having a gate electrode coupled to a first input terminal and a first electrode coupled to a first power source, the second transistor for controlling a voltage at a first node coupled to a second electrode of the second transistor corresponding to a voltage applied to the first input terminal; a first transistor having a first electrode coupled to the first input terminal and a gate electrode coupled to a second input terminal, the first transistor for controlling a voltage at a second node coupled to a second electrode of the first transistor corresponding to a voltage applied to the second input terminal; a third transistor between the first power source and the second node, the third transistor being controlled by a voltage at the first node; a fourth transistor between the first node and a second power source, the fourth transistor being controlled by a voltage applied to a third input terminal; a fifth transistor between the first power source and an output terminal, the fifth transistor being controlled by the voltage at the first node; a sixth transistor between the output terminal and a fourth input terminal, the sixth transistor being controlled by the voltage at the second node; a first capacitor between a gate electrode of the fifth transistor and the first power source; and a second capacitor between a gate electrode of the sixth transistor and the output terminal.

The third driver may include a fifth transistor having a gate electrode coupled to a first input terminal and a first electrode coupled to a first power source, the fifth transistor for controlling a voltage at a second node corresponding to a voltage applied to the first input terminal; a fourth transistor having a gate electrode coupled to the first input terminal and a second electrode coupled to a second power source, the fourth transistor for controlling a voltage at a first node corresponding to the voltage applied to the first input terminal; a sixth transistor between the second node and the second power source, the sixth transistor being controlled by a voltage at a second input terminal; a first transistor between the first power source and an output terminal, the first transistor being controlled by the voltage at the first node; a second transistor between the output terminal and the second power source, the second transistor being controlled by the voltage at the second node; a third transistor between the first power source and the first node, the third transistor being controlled by the voltage at the second node; a first capacitor between a gate electrode of the second transistor and the output terminal; and a second capacitor between a gate electrode of the first transistor and the first power source.

According to an aspect of another exemplary embodiment of the present invention, there is provided an organic light emitting display device, including a scan driver for sequentially supplying a scan signal to scan lines; a data driver for supplying data signals to data lines; pixels positioned at crossing regions of the scan lines and the data lines; and the aforementioned emission control driver for supplying emission control signals to emission control lines arranged in parallel with corresponding scan lines of the scan lines.

In an emission control driver and an organic light emitting display device according to exemplary embodiments of the present invention, the width of an emission control signal can be freely adjusted by controlling the supply times of the first and second start signals. Accordingly, luminance of the organic light emitting display device can be controlled.

BRIEF DESCRIPTION OF THE DRAWINGS

The accompanying drawings, together with the specification, illustrate exemplary embodiments of the present invention, and, together with the description, serve to explain the principles of the present invention.

FIG. 10 is a waveform diagram illustrating a driving method of the first stage shown in FIG. 3.

DETAILED DESCRIPTION OF EXEMPLARY EMBODIMENTS

Figure 1:
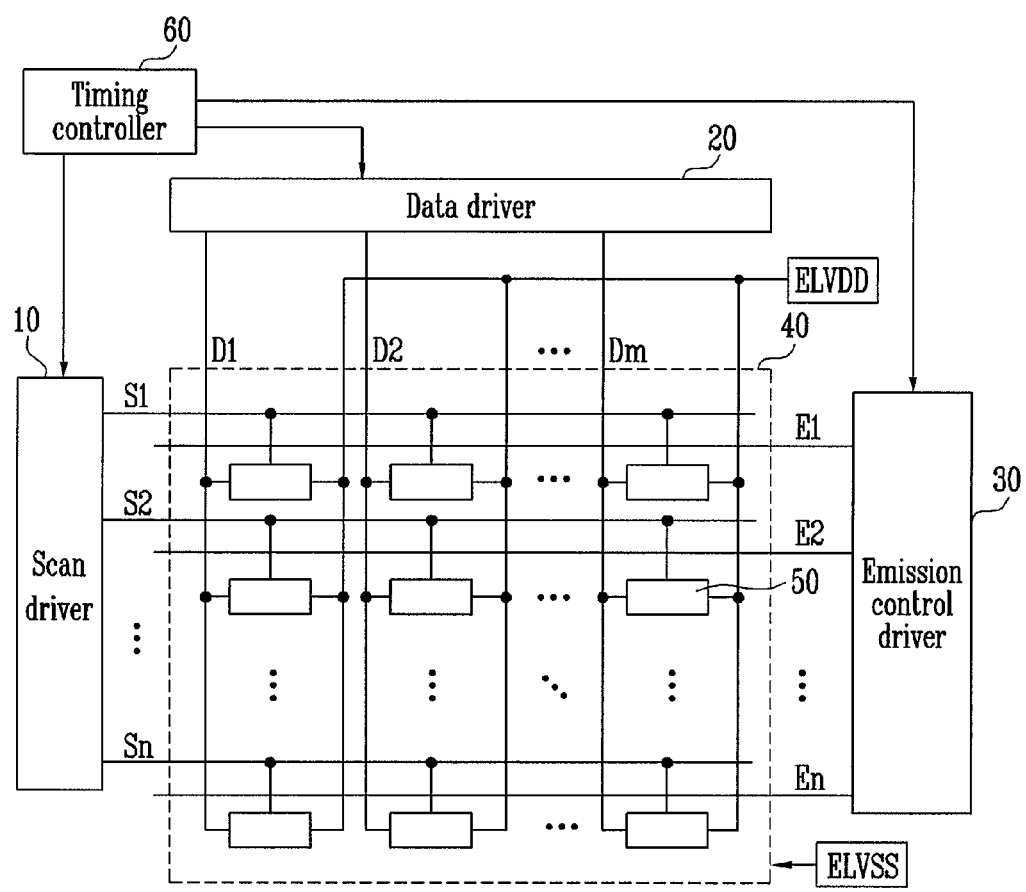
FIG. 1 is a schematic block diagram of an organic light emitting display device according to an embodiment of the present invention.

Hereinafter, certain exemplary embodiments according to the present invention will be described with reference to the accompanying drawings. Here, when a first element is described as being coupled to a second element, the first element may be directly coupled to the second element, or may be indirectly coupled to the second element via one or more additional elements. Further, some of the elements that are not essential to the complete understanding of the invention are omitted for clarity. In addition, like reference numerals refer to like elements throughout.

FIG. 1 is a schematic block diagram of an organic light emitting display device according to an embodiment of the present invention. Although FIG. 1 illustrates a scan driver 10 and an emission control driver 30 separated from each other, in some embodiments, the emission control driver 30 may be included in the scan driver 10.

Referring to FIG. 1, the organic light emitting display device according to an embodiment of the present invention includes a display unit 40 including a plurality of pixels 50 coupled to scan lines S1 to Sn, data lines D1 to Dm and emission control lines E1 to En; a scan driver 10 for driving the scan lines S1 to Sn; a data driver 20 for driving the data lines D1 to Dm; an emission control driver 30 for driving the emission control lines E1 to En; and a timing controller 60 for controlling the scan driver 10, the data driver 20 and the emission control driver 30.

The scan driver 10 sequentially supplies a scan signal to the scan lines S1 to Sn under the control of the timing controller 60. Accordingly, the pixels 50 coupled to the scan lines S1 to Sn are sequentially selected.

The data driver 20 supplies data signals to the data lines D1 to Dm under the control of the timing controller 60. Here, the data driver 20 supplies data signals to the data lines D1 to Dm when a scan signal is supplied from the scan driver 10. Then, the data signals are supplied to the pixels 50 selected by the scan signal, and each of the pixels 50 is supplied with a voltage corresponding to the data signal for the respective pixel to be charged thereto.

The emission control driver 30 sequentially supplies an emission control signal to the emission control lines E1 to En under the control of the timing controller 60. The emission control driver 30 supplies an emission control signal to pixels 50, such that the pixels 50 are in a non-emission state during the period when data signals are supplied to the respective pixels 50.

Here, a width of the emission control signal is controlled by a driving signal supplied from the timing controller 60.

Figure 2:
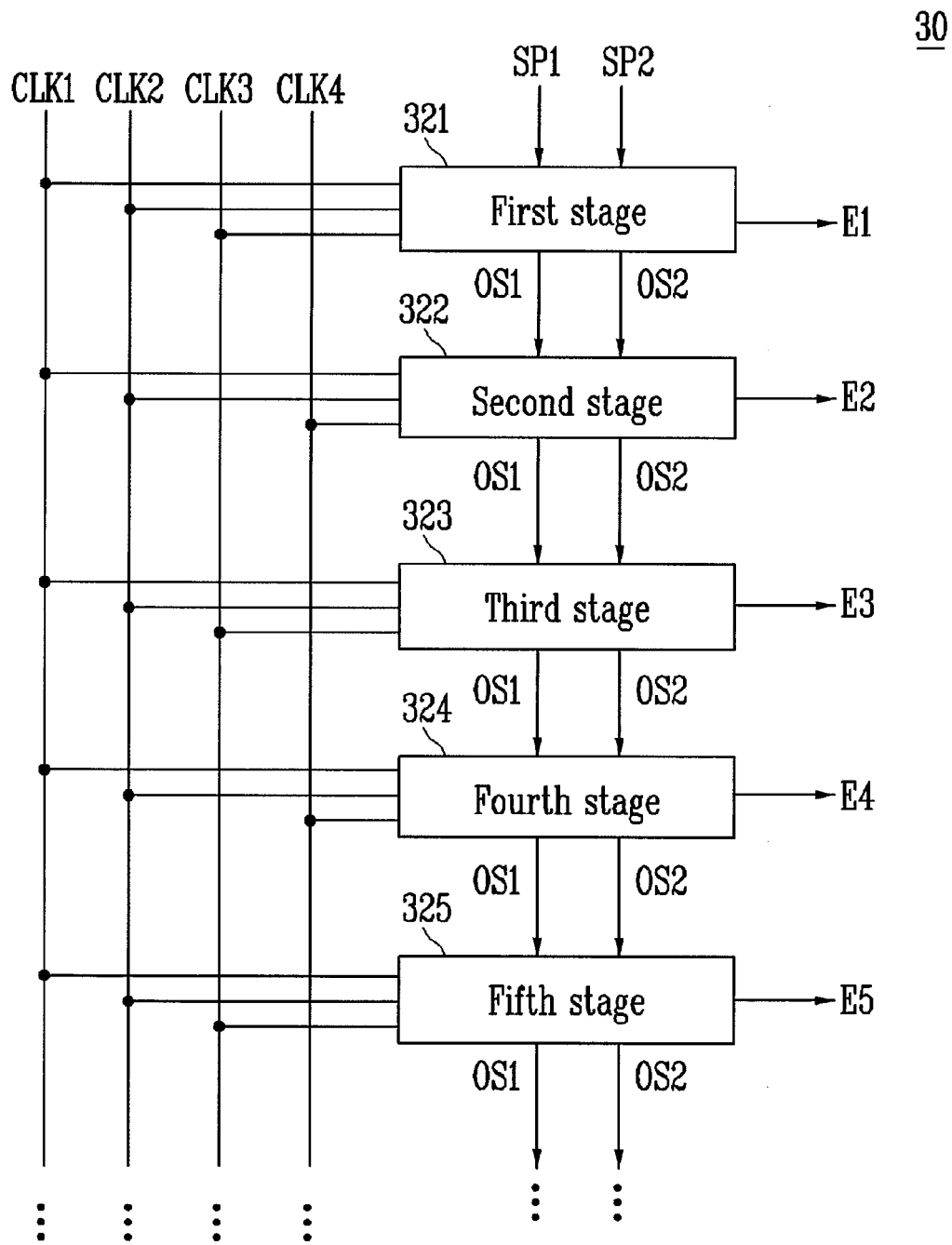
FIG. 2 is a schematic block diagram showing stages of an emission control driver shown in FIG. 1.

FIG. 2 is a block diagram schematically showing stages of the emission control driver 30 shown in FIG. 1.

Referring to FIG. 2, the emission control driver 30 according to the embodiment of the present invention includes n stages 321, 322, 323, 324, 325, etc. that respectively supply emission control signals to n emission control lines E1 to En. For convenience of illustration, five stages 321 to 325 are shown in FIG. 2. The stages 321 to 325 are coupled to the emission control lines E1 to E5, respectively, and each of the stages 321 to 325 is driven by three clock signals.

More specifically, the timing controller 60 supplies four clock signals CLK1, CLK2, CLK3 and CLK4, a first start signal SP1 and a second start signal SP2 to the emission control driver 30. Here, the first and second clock signals CLK1 and CLK2 are supplied to all the stages 321 to 325. The third clock signal CLK3 is supplied to odd-numbered stages 321, 323, etc., and the fourth clock signal CLK4 is supplied to even-numbered stages 322, 324, etc. Here, the first to fourth clock signals CLK1 to CLK4 are set to have the same period. The first and second start signals SP1 and SP2 are supplied once or more during one frame.

The first stage 321 receives the first and second start signals SP1 and SP2 supplied from the timing controller 60 and outputs an emission control signal. Here, the width of the emission control signal is determined corresponding to the width between the first and second start signals SP1 and SP2 (e.g., the time from when the first start signal SP1 is applied to when the second signal SP2 is applied). For example, when the width between the first and second start signals SP1 and SP2 is set broad, the width of the emission control signal is set broad. When the width between the first and second start signals SP1 and SP2 is set narrow, the width of the emission control signal is set narrow.

Meanwhile, the first stage 321 supplies first and second output signals OS1 and OS2 to the second stage 322. Here, the width between the first and second output signals OS1 and OS2 is determined corresponding to the width between the first and second start signals SP1 and SP2. For example, the width between the first and second output signals OS1 and OS2 may be set identical to that between the first and second start signals SP1 and SP2. The first and second output signals OS1 and OS2 perform functions similar to those of the first and second start signals SP1 and SP2, respectively. Generally, an i-th ("i" is a natural number) stage 32$i$ supplies first and second output signals OS1 and OS2 to an (i+1)-th stage 32$i$+1.

Figure 3:
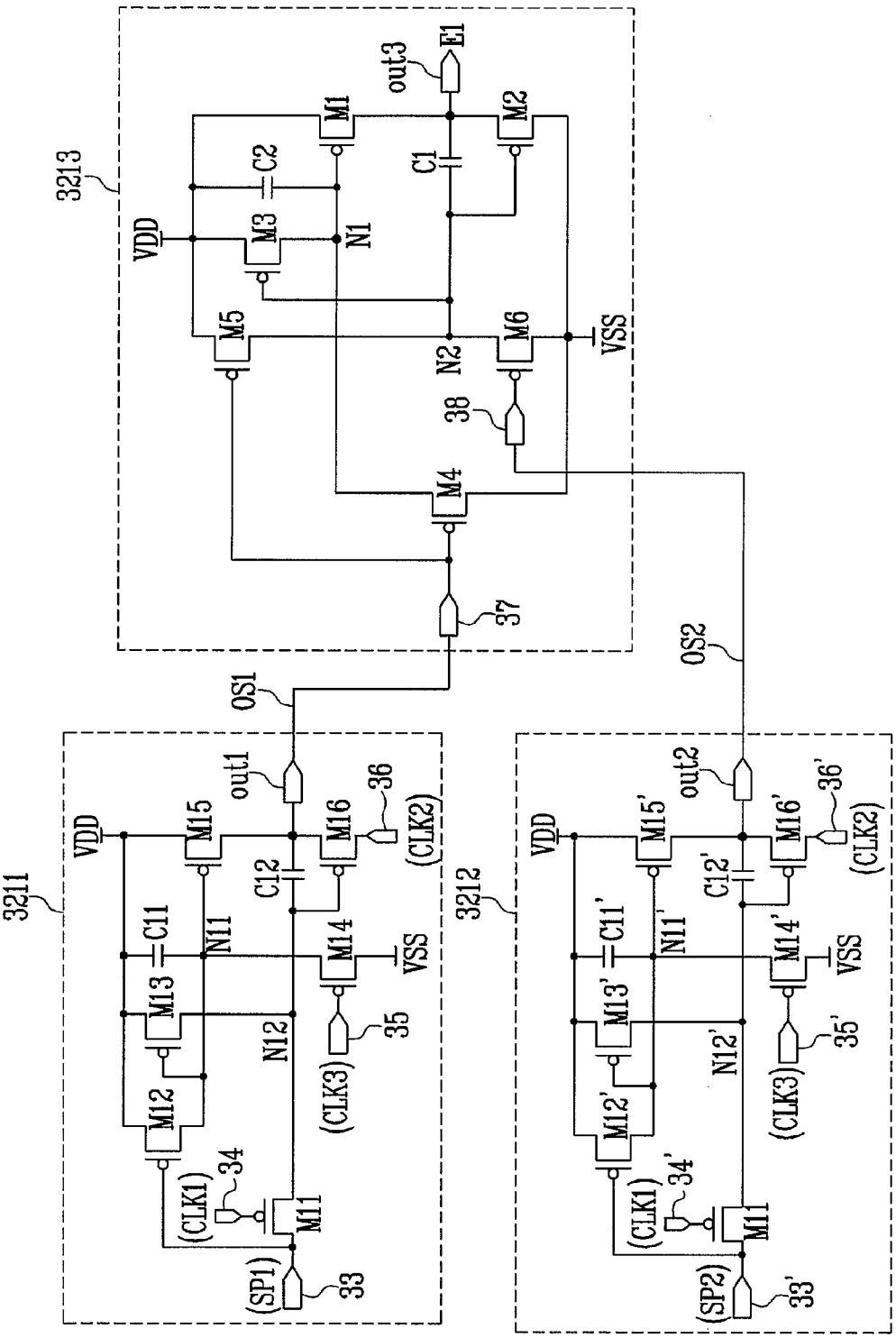
FIG. 3 is a circuit diagram of a first stage shown in FIG. 2.

FIG. 3 is a detailed circuit diagram of each of the stages shown in FIG. 2. For convenience of illustration, the first stage 321 is shown in FIG. 3.

Referring to FIG. 3, the stage 321 includes a first driver 3211, a second driver 3212 and a third driver 3213.

The first driver 3211 generates a first output signal OS1 using clock signals CLK1, CLK2 and CLK3 and the first start signal SP1.

The second driver 3212 generates a second output signal OS2 using the clock signals CLK1, CLK2 and CLK3 and the second start signal SP2. The second driver 3212 is otherwise the same circuit as the first driver 3211.

The third driver 3213 generates an emission control signal using the first and second output signals OS1 and OS2. Transistors included in the first to third drivers 3211 to 3213 are of the same conductive type, e.g., a PMOS type, as transistors included in the pixels 50. In this case, the first to third drivers 3211 to 3213 are mounted on a panel, thereby reducing manufacturing costs.

Figure 4:
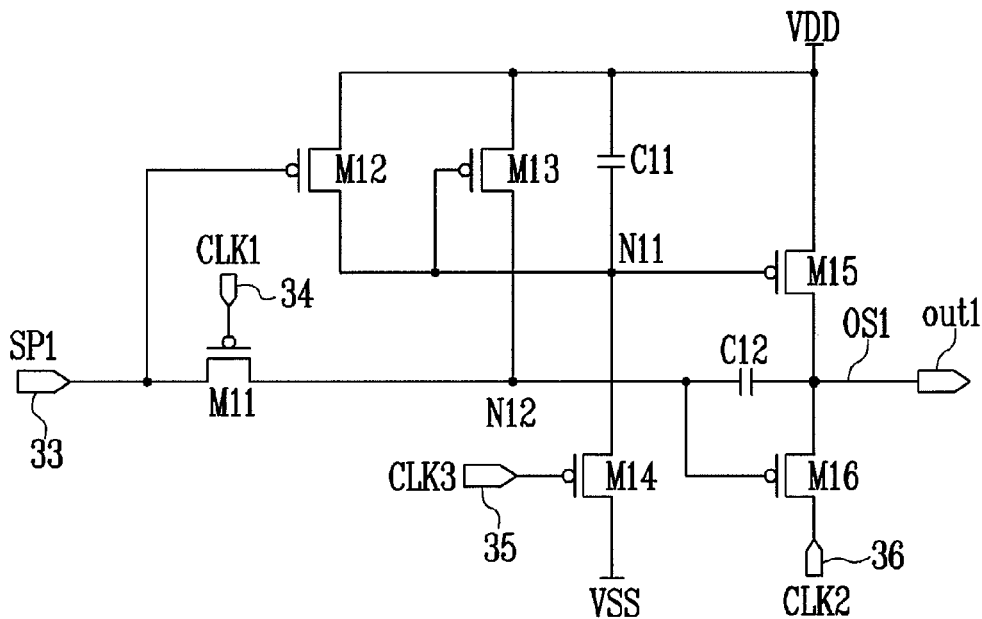
FIG. 4 is a circuit diagram of a first driver shown in FIG. 3.

FIG. 4 is a circuit diagram of the first driver 3211 shown in FIG. 3.

Referring to FIG. 4, the first driver 3211 outputs a first power source VDD or second power source VSS as the first output signal OS1. To this end, the first driver 3211 includes six transistors M11 to M16 and two capacitors C11 and C12.

The first power source VDD is set at a higher voltage than the second power source VSS. For example, the first power source VDD may be set at a voltage at which the transistors are turned off, and the second power source VSS may be set at a voltage at which the transistors are turned on.

A first electrode of a fifth transistor M15 of the first driver 3211 is coupled to the first power source VDD, and a second electrode of the fifth transistor M15 is coupled to a first output terminal out1. A gate electrode of the fifth transistor M15 is coupled to a first node N11 of the first driver 3211. The fifth transistor M15 is turned on or off by a voltage applied to the first node N11.

A first electrode of a sixth transistor M16 of the first driver 3211 is coupled to the first output terminal out1, and a second electrode of the sixth transistor M16 is coupled to a fourth input terminal 36. A gate electrode of the sixth transistor M16 is coupled to a second node N12 of the first driver 3211. The sixth transistor M16 is turned on or off by a voltage applied to the second node N12. Here, the fourth input terminal 36 receives the second clock signal CLK2 supplied from the timing controller 60.

A first electrode of a fourth transistor M14 of the first driver 3211 is coupled to the first node N11, and a second electrode of the fourth transistor M14 is coupled to the second power source VSS. A gate electrode of the fourth transistor M14 is coupled to a third input terminal 35. The fourth transistor M14 is turned on or off by a voltage applied to the third input terminal 35. Here, the third input terminal 35 receives the third clock signal CLK3 supplied from the timing controller 60.

A first electrode of a third transistor M13 of the first driver 3211 is coupled to the first power source VDD, and a second electrode of the third transistor M13 is coupled to the second node N12. A gate electrode of the third transistor M13 is coupled to the first node N11. The third transistor M13 is turned on or off by a voltage applied to the first node N11.

A first electrode of a second transistor M12 of the first driver 3211 is coupled to the first power source VDD, and a second electrode of the second transistor M12 is coupled to the first node N11. A gate electrode of the second transistor M12 is coupled to a first input terminal 33. The second transistor M12 is turned on or off by a voltage applied to the first input terminal 33. Here, the first input terminal 33 receives the first start signal SP1 supplied from the timing controller 60.

A first electrode of a first transistor M11 of the first driver 3211 is coupled to the first input terminal 33, and a second electrode of the first transistor M11 is coupled to the second node N12. A gate electrode of the first transistor M11 is coupled to a second input terminal 34. The first transistor M11 is turned on or off by a voltage applied to the second input terminal 34. Here, the second input terminal 34 receives the first clock signal CLK1 supplied from the timing controller 60.

A first capacitor C11 of the first driver 3211 is coupled between the gate electrode of the fifth transistor M15 and the first power source VDD. A voltage at which the fifth transistor M15 is turned on or off is charged in the first capacitor C11. For example, when the fifth transistor M15 is turned on, a voltage at which the fifth transistor M15 is turned on is charged in the first capacitor C11. When the fifth transistor M15 is turned off, a voltage at which the fifth transistor M15 is turned off is charged in the first capacitor C11.

A second capacitor C12 of the first driver 3211 is coupled between the gate electrode of the sixth transistor M16 and the first output terminal out1. A voltage at which the sixth transistor M16 is turned on or off is charged in the second capacitor C12.

Meanwhile, the second driver 3212 is configured similarly to the first driver 3211, except that the second start signal SP2 is supplied to a first input terminal 33' of the second driver 3212. Therefore, a detailed description of the second driver 3212 will be omitted.

Figure 5:
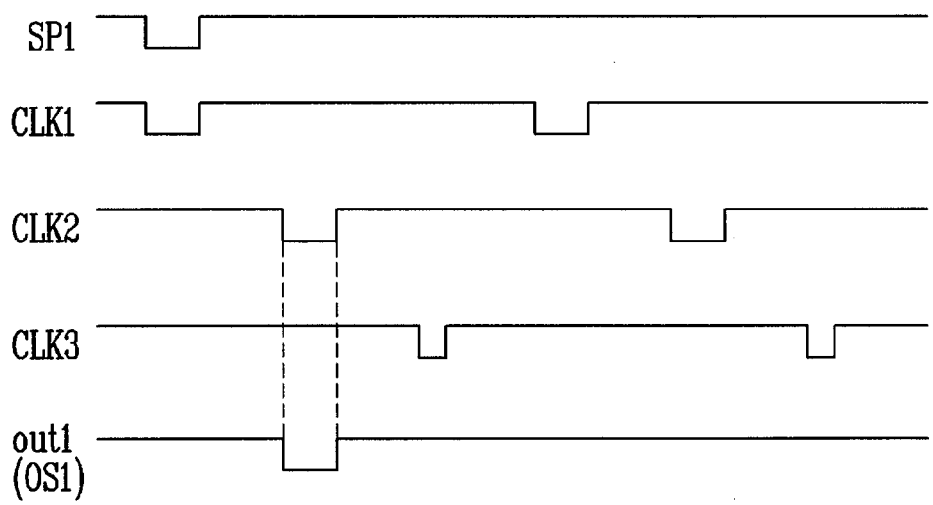
FIG. 5 is a waveform diagram illustrating an operation of the first driver shown in FIG. 4.

FIG. 5 is a waveform diagram illustrating an operation of the first driver 3211 shown in FIG. 4.

The operation of the first driver 3211 will be described in detail with reference to FIGS. 4 and 5. First, the first start signal SP1 is supplied in synchronization with the first clock signal CLK1. Here, the first start signal SP1 and the first clock signal CLK1 may be set to have substantially the same width. In other words, the first start signal SP1 is applied at substantially the same time as the first clock signal CLK.

If the first clock signal CLK1 and the first start signal SP1 are applied, the first and second transistors M11 and M12 are turned on. When the first transistor M11 is turned on, the first input terminal 33 is electrically coupled to the second node N12. In this case, the voltage (i.e., low voltage) of the first start signal SP1 is applied to the second node N12.

If the first start signal SP1 is supplied to the second node N12, the sixth transistor M16 is turned on. When the sixth transistor M16 is turned on, the fourth input terminal 36 is coupled to the first output terminal out1. In this case, the voltage of the second clock signal CLK2 is applied to the first output terminal out1.

Meanwhile, if the second transistor M12 is turned on, the first power source VDD is supplied to the first node N11. When the first power source VDD is supplied to the first node N11, the third and fifth transistors M13 and M15 are turned off.

Thereafter, the supply of the first clock signal CLK1 and the first start signal SP1 is stopped (i.e., the respective signals become high voltage). When the supply of the first clock signal CLK1 is stopped, the first transistor M11 is turned off. At this time, the sixth transistor M16 maintains a turned-on state. In other words, since a voltage at which the sixth transistor M16 is turned on is charged in the second capacitor C12 during the previous period, the sixth transistor M16 maintains a turned-on state.

The second clock signal CLK2 (i.e., low voltage) is subsequently supplied during the period when the sixth transistor M16 is in a turned-on state. Therefore, a low voltage is outputted to the first output terminal out1.

After the second clock signal CLK2 is supplied, the third clock signal CLK3 is supplied. When the third clock signal CLK3 is supplied, the second power source VSS is supplied to the first node N11. When the second power source VSS is supplied to the first node N11, the third and fifth transistors M13 and M15 are turned on.

If the third transistor M13 is turned on, the first power source VDD is supplied to the second node N12. When the first power source VDD is supplied to the second node N12, the sixth transistor M16 is turned off. If the fifth transistor M15 is turned on, the first power source VDD is supplied to the first output terminal out1. At this time, a voltage at which the fifth transistor M15 is turned on is charged in the first capacitor C11.

The first clock signal CLK1 is subsequently supplied, and the first transistor M11 is turned on. At this time, a high voltage is maintained at the first input terminal 33, and accordingly, the sixth transistor M16 maintains a turned-off state. The fifth transistor M15 outputs the voltage of the first power source VDD to the first output terminal out1 while maintaining a turned-on state.

As described above, when the first start signal SP1 is supplied, the first driver 3211 supplies a subsequent second clock signal CLK2 (i.e., low voltage) to the first output terminal out1. Similarly, when the second start signal SP2 is supplied, the second driver 3212 also supplies a subsequent second clock signal CLK2 to the second output terminal out2.

The clock signals CLK1 to CLK3 supplied to the respective input terminals 34 to 36 shown in FIG. 4 are applied to the odd-numbered stages 321, 323, etc. However, a different arrangement of clock signals are applied to the even-numbered stages 322, 324, etc.

Figure 6:
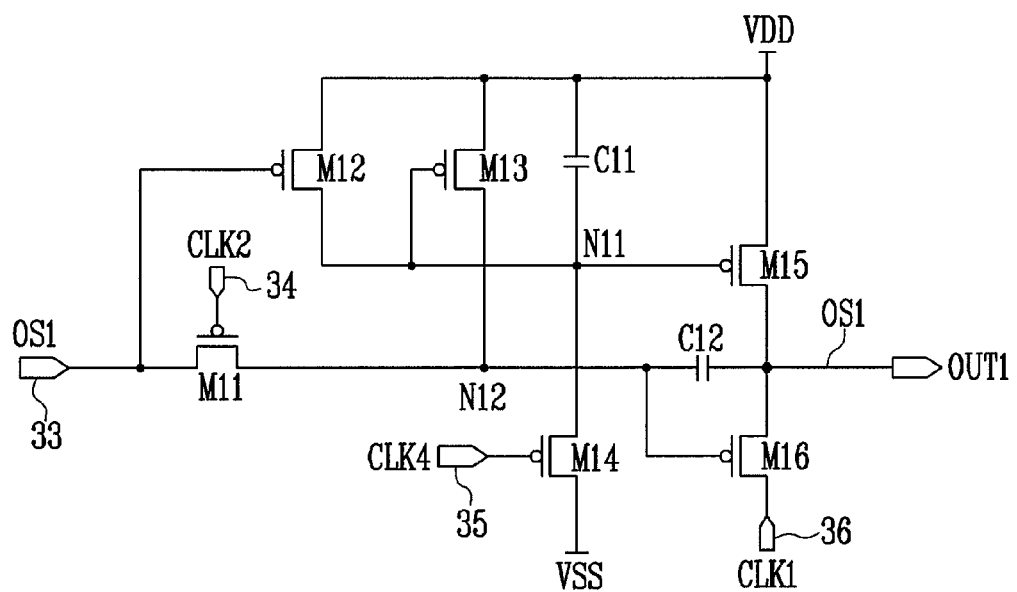
FIG. 6 is a circuit diagram of a first driver included in a second stage shown in FIG. 2.

FIG. 6 is a circuit diagram of a first driver included in each of the even-numbered stages in accordance with an embodiment of the present invention. For convenience of illustration, the second stage 322 is shown in FIG. 6.

Referring to FIG. 6, the first driver of the second stage 322 has the same circuit structure as that of the first driver included in each of the odd-numbered stages 321, 323, etc., which is described with respect to FIG. 4.

However, the first input terminal 33 receives the first output signal OS1 outputted from the first driver of the first stage 321, and the second input terminal 34 receives the second clock signal CLK2 supplied from the timing controller 60. The third and fourth input terminals 35 and 36 respectively receive the fourth and first clock signals CLK4 and CLK1 supplied from the timing controller 60.

Figure 7:
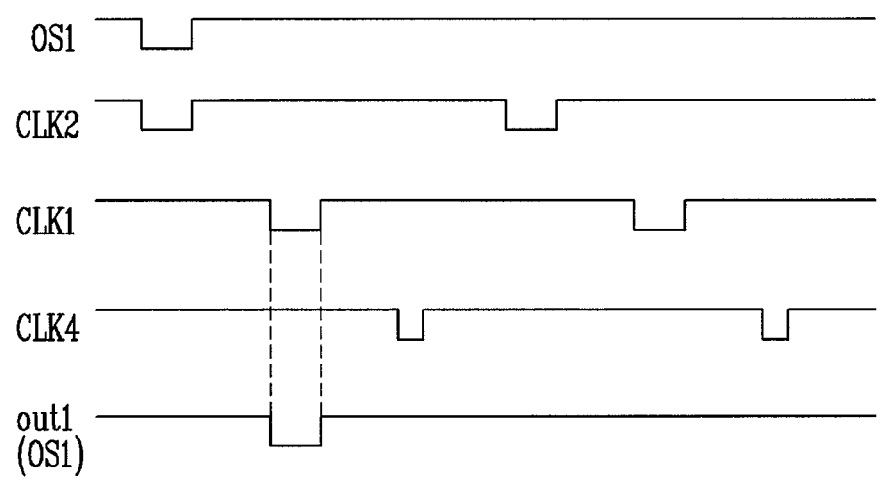
FIG. 7 is a waveform diagram illustrating an operation of the first driver shown in FIG. 6.

An operation of the first driver of the second stage 322 will be briefly described in conjunction with FIG. 7. Since the first output signal OS1 is supplied at the same time when the second clock signal CLK2 is supplied, the sixth transistor M16 of the first driver of the second stage 322 is turned on, and the first clock signal CLK1 is supplied to the first output terminal out1.

Thereafter, when the fourth clock signal CLK4 is supplied, the fifth transistor M15 of the first driver of the second stage 322 is turned on, and the sixth transistor M16 is turned off. Then, a high voltage is applied to the first output terminal out1. That is, when the first output signal OS1 is supplied, the first driver of the second stage 322 supplies a subsequent first clock signal CLK1 (i.e., low voltage) to the first output terminal out1. Similarly, when the second output signal OS2 is supplied, a second driver of the second stage 322 also supplies a subsequent first clock signal CLK1 to the second output terminal out2.

Figure 8A:
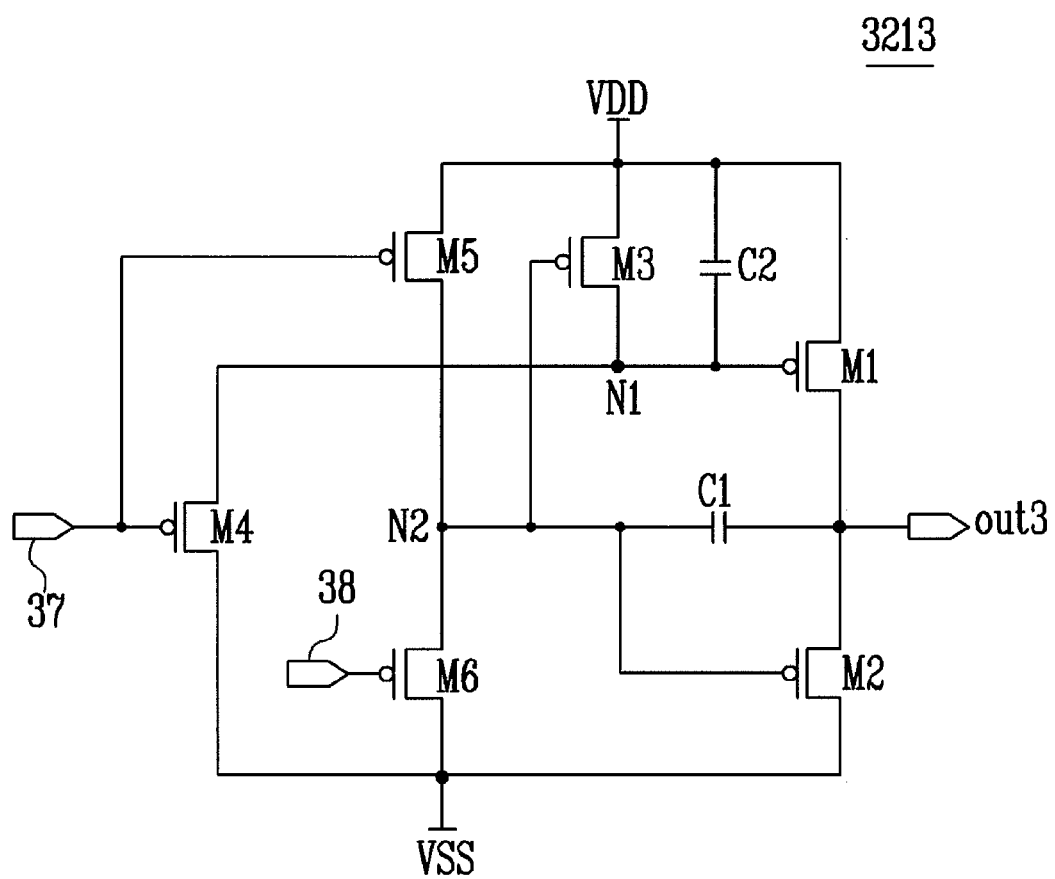
FIGS. 8A and 8B are circuit diagrams showing embodiments of a third driver shown in FIG. 3, respectively.

FIG. 8A is a circuit diagram of the third driver 3213 shown in FIG. 3.

Referring to FIG. 8A, the third driver 3213 outputs a voltage of the first or second power source VDD or VSS to a third output terminal out3 in response to the first and second output signals OS1 and OS2. To this end, the third driver 3213 includes 6 transistors M1 to M6 and two capacitors C1 and C2.

A first electrode of the first transistor M1 of the third driver 3213 is coupled to the first power source VDD, and a second electrode of the first transistor M1 is coupled to the third output terminal out3. A gate electrode of the first transistor M1 is coupled to a first node N1 of the third driver 3213. The first transistor M1 is turned on or off by a voltage applied to the first node N1.

A first electrode of the second transistor M2 of the third driver 3213 is coupled to the third output terminal out3, and a second electrode of the second transistor M2 is coupled to the second power source VSS. A gate electrode of the second transistor M2 is coupled to a second node N2 of the third driver 3213. The second transistor M2 is turned on or off by a voltage applied to the second node N2.

A first electrode of the third transistor M3 of the third driver 3213 is coupled to the first power source VDD, and a second electrode of the third transistor M3 is coupled to the first node N1. A gate electrode of the third transistor M3 is coupled to the second node N2. The third transistor M3 is turned on or off by a voltage applied to the second node N2.

The first capacitor C1 of the third driver 3213 is coupled between the gate electrode of the second transistor M2 and the third output terminal out3. A voltage at which the second transistor M2 is turned on or off is charged in the first capacitor C1. For example, when the second transistor M2 is turned on, a voltage at which the second transistor M2 is turned on is charged in the first capacitor C1. When the second transistor M2 is turned off, a voltage at which the second transistor M2 is turned off is charged in the first capacitor C1.

The second capacitor C2 of the third driver 3213 is coupled between the gate electrode of the first transistor M1 and the first power source VDD. A voltage at which the first transistor M1 is turned on or off is charged in the second capacitor C2.

A first electrode of the fifth transistor M5 of the third driver 3213 is coupled to the first power source VDD, and a second electrode of the fifth transistor M5 is coupled to the second node N2. A gate electrode of the fifth transistor M5 is coupled to a fifth input terminal 37. The fifth transistor M5 is turned on or off by a voltage applied to the fifth input terminal 37. Here, the fifth input terminal 37 receives the first output signal OS1 supplied from the first driver 3211.

Figure 8B:
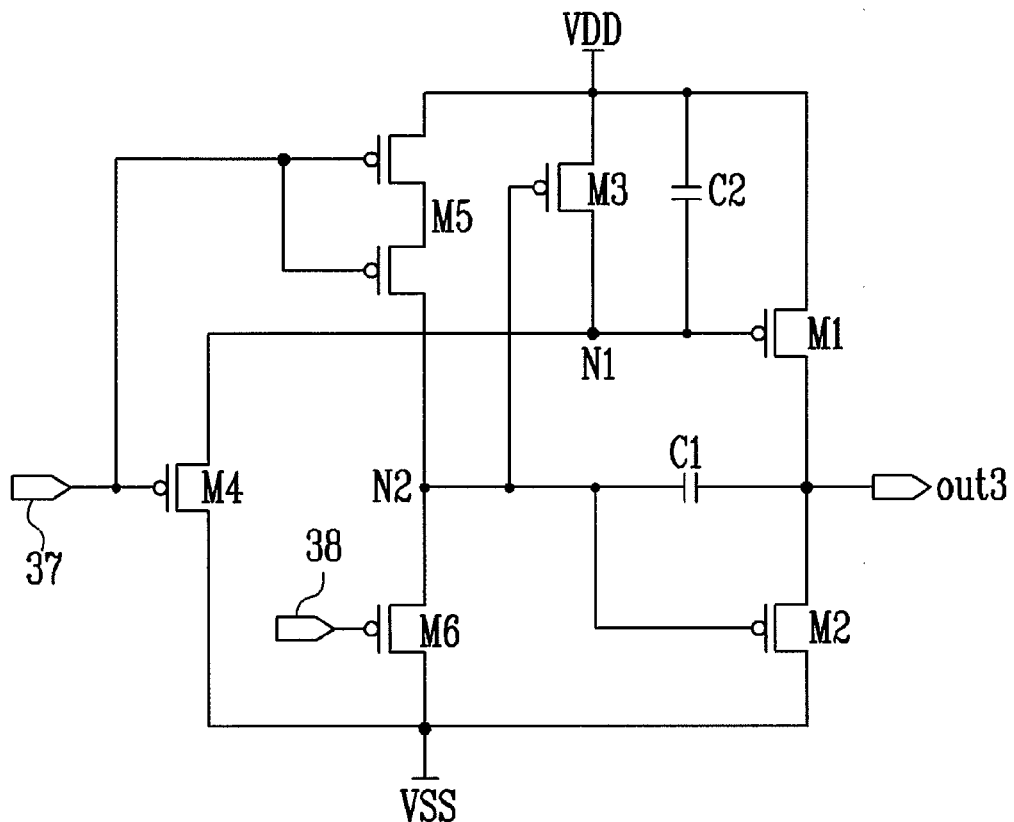

Meanwhile, for driving stability, the fifth transistor M5 may include two or more transistors coupled in series, as shown in FIG. 8B, for supplying the voltage of the first power source VDD to the second node N2.

A first electrode of the sixth transistor M6 of the third driver 3213 is coupled to the second node N2, and a second electrode of the sixth transistor M6 is coupled to the second power source VSS. A gate electrode of the sixth transistor M6 is coupled to a sixth input terminal 38. The sixth transistor M6 is turned on or off by a voltage applied to the sixth input terminal 38. Here, the sixth terminal 38 receives the second output signal OS2 supplied from the second driver 3212.

A first electrode of the fourth transistor M4 of the third driver 3213 is coupled to the first node N1, and a second electrode of the fourth transistor M4 is coupled to the second power source VSS. A gate electrode of the fourth transistor M4 is coupled to the fifth input terminal 37. The fourth transistor M4 is turned on or off by a voltage applied to the fifth input terminal 37.

Figure 9:
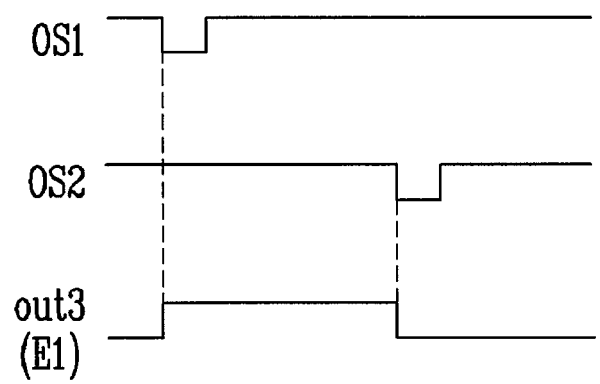
FIG. 9 is a waveform diagram illustrating an operation of the third driver shown in FIG. 8.

FIG. 9 is a waveform diagram illustrating an operation of the third driver shown in FIGS. 8A and 8B.

Referring to FIG. 9, if the first output signal OS1 (i.e., low voltage) is supplied to the fifth input terminal 37, the fourth and fifth transistors M4 and M5 are turned on. At this time, since a high voltage is supplied to the sixth input terminal 38, the sixth transistor M6 is turned off.

When the fifth transistor M5 is turned on, the voltage of the first power source VDD is applied to the second node N2. In this case, the second and third transistors M2 and M3 coupled to the second node N2 are turned off.

When the fourth transistor M4 is turned on, the voltage of the second power source VSS is applied to the first node N1. In this case, the first transistor M1 coupled to the first node N1 is turned on. If the first transistor M1 is turned on, the voltage of the first power source VDD is applied to the third output terminal out3. Accordingly, an emission control signal is supplied to an emission control line E1 coupled to the third output terminal out3.

Meanwhile, a voltage at which the first transistor M1 is turned on is charged in the second capacitor C2, and a voltage at which the second transistor M2 is turned on is charged in the first capacitor C1. Accordingly, even after the fourth and fifth transistors M4 and M5 are turned off by the supply of a high voltage applied to the fifth input terminal 37, the voltage of the first power source VDD is still applied to the third output terminal out3 while the first and second transistors M1 and M2 maintain turned-on and turned-off states, respectively.

Thereafter, the second output signal OS2 (i.e., low voltage) is supplied to the sixth input terminal 38, so that the sixth transistor M6 is turned on. A high voltage is applied to the fifth input terminal 37 during the period when the second output signal OS2 is supplied so that the fourth and fifth transistors M4 and M5 are turned off.

If the sixth transistor M6 is turned on, the voltage of the second power source VSS is applied to the second node N2. In this case, the third and second transistors M3 and M2 coupled to the second node N2 are turned on.

When the third transistor M3 is turned on, the voltage of the first power source VDD is applied to the first node N1. In this case, the first transistor M1 coupled to the first node N1 is turned off. When the second transistor M2 is turned on, the voltage of the second power source VSS is applied to the third output terminal out3. Accordingly, the supply of the emission control signal to the emission control line E1 coupled to the third output terminal out3 is stopped (i.e., the emission control signal becomes low voltage).

Meanwhile, the voltage at which the first transistor M1 is turned off is charged in the second capacitor C2, and the voltage at which the second transistor M2 is turned on is charged in the first capacitor C1. Accordingly, the voltage at the third output terminal out3 can be stably maintained at the voltage of the second power source VSS during the period before a subsequent first output signal OS1 is supplied to the first input terminal 37.

FIG. 10 is a waveform diagram showing driving waveforms supplied to the first stage shown in FIG. 3. For convenience of illustration, only driving waveforms respectively supplied to the first and second emission control lines E1 and E2 are shown in FIG. 10. In FIG. 10, 1H refers to one horizontal period.

The method of driving the first stage will be described in conjunction with FIGS. 3 and 10. First, the third, first and fourth clock signals CLK3, CLK1 and CLK4 are sequentially supplied in accordance with the second clock signal CLK2.

The first start signal SP1 is supplied in synchronization with the first clock signal CLK1 (i.e., at substantially the same time), and the second start signal SP2 is supplied in synchronization with a subsequent first clock signal CLK1 after the first start signal SP1 is supplied.

When the first start signal SP1 is supplied, the sixth transistor M16 of the first driver 3211 is turned on, so that the fourth input terminal 36 is coupled to the first output terminal out1. Accordingly, the second clock signal CLK2 is supplied as the first output signal OS1 to the fifth input terminal 37 of the third driver 3213.

When the second start signal SP2 is supplied, a sixth transistor M16' of the second driver 3212 is turned on, so that a fourth input terminal 36' is coupled to the second output terminal out2. Accordingly, the second clock signal CLK2 is supplied as the second output signal OS2 to the sixth input terminal 38 of the third driver 3213.

The third driver 3213 generates an emission control signal (i.e., high voltage) supplied to the first emission control line E1 when the first output signal OS1 of a low voltage is supplied (i.e., at the time when the second clock signal CLK2 is supplied). The third driver 3213 stops generating the emission control signal supplied to the first emission control line E1 when the second output signal OS2 of a low voltage is supplied. Here, the width of the emission control signal is set as the time (i.e., width) T between supply of the first and second start signals SP1 and SP2. In other words, in an embodiment of the present invention, the width of the emission control signal can be variously set by controlling the supply times of the first and second start signals SP1 and SP2.

Meanwhile, the first and second output signals OS1 and OS2 from the first stage 321 are respectively supplied to the first and second drivers of the second stage 322. Then, the first driver outputs the first clock signal CLK1 at a substantially same time as the first output signal OS1, and the second driver outputs the first clock signal CLK1 at substantially the same time as a subsequent second output signal OS2. The third driver included in the second stage 322 generates an emission control signal supplied to the second emission control line E2 by utilizing the first and second output signals OS1 and 052 respectively supplied from the first and second drivers of the second stage 322.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. An emission control driver comprising a plurality of non-overlapping stages, each of the plurality of stages comprising:

a first driver for outputting a first output signal corresponding to one of the first output signal output from a previous stage of the plurality of stages or a first start pulse;
a second driver for outputting a second output signal corresponding to one of the second output signal output from the previous stage or a second start pulse; and
a third driver for receiving the first and second output signals and for outputting an emission control signal,
wherein every odd-numbered stage from among the plurality of stages, coupled to corresponding odd-numbered emission control lines, is configured to be driven by a first clock signal, a second clock signal, and a third clock signal from among a plurality of clock signals,
wherein every even-numbered-stage from among the plurality of stages, coupled to corresponding even-numbered emission control lines, is configured to be driven by the first clock signal, the second clock signal, and a fourth clock signal from among the plurality of clock signals, and
wherein each of the first, second, third, and fourth clock signals different from one another.

2. The emission control driver of claim 1, wherein the plurality of clock signals are sequentially supplied in an order of the second clock signal, the third clock signal, the first clock signal, and the fourth clock signal.

3. The emission control driver of claim 2, wherein the first clock signal, the second clock signal, the third clock signal, and the fourth clock signal have a substantially same period as one another.

4. The emission control driver of claim 1, wherein the first and second start pulses are supplied to a first stage of the plurality of stages, and wherein a width of the emission control signal corresponds to a time duration between the first and second start pulses.

5. The emission control driver of claim 1, wherein the first start pulse is supplied in synchronization with the first clock signal, and wherein the second start pulse is supplied in synchronization with a subsequent first clock signal.

6. The emission control driver of claim 1, wherein each of the first and second drivers comprises:
a second transistor having a gate electrode coupled to a first input terminal and a first electrode coupled to a first power source, the second transistor for controlling a voltage at a first node coupled to a second electrode of the second transistor corresponding to a voltage applied to the first input terminal;
a first transistor having a first electrode coupled to the first input terminal and a gate electrode coupled to a second input terminal, the first transistor for controlling a voltage at a second node coupled to a second electrode of the first transistor corresponding to a voltage applied to the second input terminal;
a third transistor between the first power source and the second node, the third transistor being controlled by a voltage at the first node;
a fourth transistor between the first node and a second power source, the fourth transistor being controlled by a voltage applied to a third input terminal;
a fifth transistor between the first power source and an output terminal, the fifth transistor being controlled by the voltage at the first node;
a sixth transistor between the output terminal and a fourth input terminal, the sixth transistor being controlled by the voltage at the second node;
a first capacitor between a gate electrode of the fifth transistor and the first power source; and
a second capacitor between a gate electrode of the sixth transistor and the output terminal.

7. The emission control driver of claim 6, wherein the first power source is set at a higher voltage than a voltage of the second power source.

8. The emission control driver of claim 6, wherein one of the first output signal from the previous stage or the first start pulse is supplied to the first input terminal of the first driver, and one of the second output signal from the previous stage or the second start pulse is supplied to the first input terminal of the second driver.

9. The emission control driver of claim 6, wherein the first clock signal, the third clock signal, and the second clock signal are respectively supplied to the second input terminal, the third input terminal, and the fourth input terminal of each of the first and second drivers of each of the odd-numbered stages.

10. The emission control driver of claim 6, wherein the second clock signal, the fourth clock signal, and the first clock signal are respectively supplied to the second input terminal, the third input terminal, and the fourth input terminal of each of the first and second drivers of each of the even-numbered stages.

11. The emission control driver of claim 6, wherein the first driver is configured to output the first output signal to the output terminal of the first driver, and wherein the second driver is configured to output the second output signal to the output terminal of the second driver.

12. The emission control driver of claim 1, wherein the third driver is configured to output a high emission control signal from a time when a low first output signal is supplied to a time when a low second output signal is supplied.

13. The emission control driver of claim 12, wherein the third driver comprises:
a fifth transistor having a gate electrode coupled to a first input terminal and a first electrode coupled to a first power source, the fifth transistor for controlling a voltage at a second node corresponding to a voltage applied to the first input terminal;
a fourth transistor having a gate electrode coupled to the first input terminal and a second electrode coupled to a second power source, the fourth transistor for controlling a voltage at a first node corresponding to the voltage applied to the first input terminal;
a sixth transistor between the second node and the second power source, the sixth transistor being controlled by a voltage at a second input terminal;
a first transistor between the first power source and an output terminal, the first transistor being controlled by the voltage at the first node;
a second transistor between the output terminal and the second power source, the second transistor being controlled by the voltage at the second node;
a third transistor between the first power source and the first node, the third transistor being controlled by the voltage at the second node;
a first capacitor between a gate electrode of the second transistor and the output terminal; and
a second capacitor between a gate electrode of the first transistor and the first power source.

14. The emission control driver of claim 13, wherein the first output signal is supplied to the first input terminal, and wherein the second output signal is supplied to the second input terminal.

15. The emission control driver of claim 13, wherein the output terminal is coupled to a corresponding emission control line of the emission control lines.

16. The emission control driver of claim 13, wherein the fifth transistor is coupled to a seventh transistor in series.

17. An organic light emitting display device, comprising:
a scan driver for sequentially supplying a scan signal to scan lines;
a data driver for supplying data signals to data lines;
an emission control driver for supplying emission control signals to emission control lines arranged in parallel with corresponding scan lines of the scan lines; and
pixels positioned at crossing regions of the scan lines and the data lines,
wherein the emission control driver comprises a plurality of non-overlapping stages, each of the plurality of stages comprising:
a first driver for outputting a first output signal corresponding to one of the first output signal output from a previous stage of the plurality of stages or a first start pulse;
a second driver for outputting a second output signal corresponding to one of the second output signal output from the previous stage or a second start pulse; and
a third driver for receiving the first and second output signals and for outputting an emission control signal,
wherein every odd-numbered stage from among the plurality of stages, coupled to corresponding odd-numbered emission control lines, is configured to be driven by a first clock signal, a second clock signal, and a third clock signal from among a plurality of clock signals,
wherein every even-numbered stage from among the plurality of stages, coupled to corresponding even-numbered emission control lines, is configured to be driven by the first clock signal, the second clock signal, and a fourth clock signal from among the plurality of clock signals, and
wherein each of the first, second, third, and fourth clock signals are different from one another.

18. The organic light emitting display device of claim 17, wherein the plurality of clock signals are sequentially supplied in an order of the second clock signal, the third clock signal, the first clock signal, and the fourth clock signal.

19. The organic light emitting display device of claim 17, wherein each of the first and second drivers comprises:
a second transistor having a gate electrode coupled to a first input terminal and a first electrode coupled to a first power source, the second transistor for controlling a voltage at a first node coupled to a second electrode of the second transistor corresponding to a voltage applied to the first input terminal;
a first transistor having a first electrode coupled to the first input terminal and a gate electrode coupled to a second input terminal, the first transistor for controlling a voltage at a second node coupled to a second electrode of the first transistor corresponding to a voltage applied to the second input terminal;
a third transistor between the first power source and the second node, the third transistor being controlled by a voltage at the first node;
a fourth transistor between the first node and a second power source, the fourth transistor being controlled by a voltage applied to a third input terminal;
a fifth transistor between the first power source and an output terminal, the fifth transistor being controlled by the voltage at the first node;
a sixth transistor between the output terminal and a fourth input terminal, the sixth transistor being controlled by the voltage at the second node;
a first capacitor between a gate electrode of the fifth transistor and the first power source; and
a second capacitor between a gate electrode of the sixth transistor and the output terminal.

20. The organic light emitting display device of claim 19, wherein the first clock signal, the third clock signal, and the second clock signal are respectively supplied to the second input terminal, the third input terminal, and the fourth input terminal of each of the first and second drivers of each of the odd-numbered stages.

21. The organic light emitting display device of claim 19, wherein the second clock signal, the fourth clock signal, and the first clock signal are respectively supplied to the second input terminal, the third input terminal, and the fourth input terminal of each of the first and second drivers of each of the even-numbered stages.

22. The organic light emitting display device of claim 17, wherein the third driver is configured to output a high emission control signal from a time when a low first output signal is supplied to a time when a low second output signal is supplied.

23. The organic light emitting display device of claim 22, wherein the third driver comprises:
a fifth transistor having a gate electrode coupled to a first input terminal and a first electrode coupled to a first power source, the fifth transistor for controlling a voltage at a second node corresponding to a voltage applied to the first input terminal;
a fourth transistor having a gate electrode coupled to the first input terminal and a second electrode coupled to a second power source, the fourth transistor for controlling a voltage at a first node corresponding to the voltage applied to the first input terminal;
a sixth transistor between the second node and the second power source, the sixth transistor being controlled by a voltage at a second input terminal;
a first transistor between the first power source and an output terminal, the first transistor being controlled by the voltage at the first node;
a second transistor between the output terminal and the second power source, the second transistor being controlled by the voltage at the second node;
a third transistor between the first power source and the first node, the third transistor being controlled by the voltage at the second node;
a first capacitor between a gate electrode of the second transistor and the output terminal; and
a second capacitor between a gate electrode of the first transistor and the first power source.

* * * * *

UNITED STATES PATENT AND TRADEMARK OFFICE
CERTIFICATE OF CORRECTION

| | |
|---|---|
| PATENT NO. | : 8,599,117 B2 |
| APPLICATION NO. | : 12/608991 |
| DATED | : December 3, 2013 |
| INVENTOR(S) | : Hwan-Soo Jang |

It is certified that error appears in the above-identified patent and that said Letters Patent is hereby corrected as shown below:

In the Claims

Column 11, Claim 1, line 21      After "signals"

Insert -- are --

Signed and Sealed this
Twenty-sixth Day of May, 2015

Michelle K. Lee
*Director of the United States Patent and Trademark Office*